United States Patent [19]

Siddall et al.

[11] 3,728,396

[45] Apr. 17, 1973

[54] ALIPHATIC KETONES

[75] Inventors: John B. Siddall; Clive A. Henrick, both of Palo Alto, Calif.

[73] Assignee: Zoecon Corporation, Palo Alto, Calif.

[22] Filed: Oct. 12, 1970

[21] Appl. No.: 80,128

Related U.S. Application Data

[63] Continuation-in-part of Ser. No. 78,908, Oct. 7, 1970.

[52] U.S. Cl..........260/593 R, 260/340.9, 260/410.9, 260/586 R, 260/592, 260/594, 424/331
[51] Int. Cl.................................................C07c 49/12
[58] Field of Search ...............260/593 R, 592, 586 R

[56] References Cited

UNITED STATES PATENTS

| 2,783,257 | 2/1957 | Surmatis et al. | 260/563 R |
| 3,431,271 | 3/1969 | Van Loo | 260/593 R |
| 3,453,317 | 7/1969 | Marbet et al. | 260/593 R |

*Primary Examiner*—Alex Mazel
*Assistant Examiner*—James H. Turnipseed
*Attorney*—Donald W. Erickson

[57] ABSTRACT

Preparation of novel carbonyl compounds useful as lubricants, plasticizers, intermediates, odorants and insect control agents.

7 Claims, No Drawings

ALIPHATIC KETONES

This is a continuation-in-part of application Ser. No. 78,908, filed Oct. 7, 1970.

This invention relates to novel saturated and unsaturated carbonyl compounds, the control of insects, and synthesis of the novel compounds.

The novel unsaturated carbonyl compounds of the present invention are represented by the following formula A:

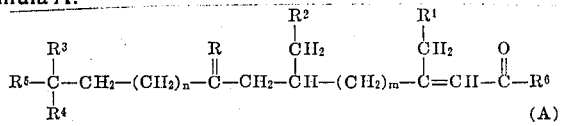

wherein, $m$ is a positive integer of one to five;

$n$ is zero or a positive integer of one to four;

R is oxygen atom or cycloethylenedioxy;

each of $R^1$ and $R^2$ is hydrogen or lower alkyl having a chain length of one to five carbon atoms;

$R^3$ is hydrogen or lower alkyl having a chain length of one to six carbon atoms;

$R^4$ is hydrogen or lower alkyl having a chain length of one to six carbon atoms;

$R^5$ is lower alkyl having a chain length of one to six carbon atoms; and $R^6$ is hydrogen, alkyl, cycloalkyl, phenyl or aralkyl.

The term "alkyl," as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. The term "lower alkyl," as used herein, refers to a primary or secondary alkyl group, branched or straight chain. The term "lower alkyl," however, when used in defining the group "R " includes tertiary alkyl groups. The term "cycloalkyl," as used herein, refers to a cycloalkyl group of four to eight carbon atoms, i.e., cyclobutyl, cyclopentyl, cyclohexyl, cycloheptyl and cyclooctyl. The term "aralkyl," as used herein, refers to an aralkyl group of seven to twelve carbon atoms, such as benzyl, phenylethyl, methylbenzyl and naphthylmethyl. The term "metal," as used herein, refers to lithium, sodium, potassium, calcium, strontium, copper, manganese and zinc.

The compounds of formula A, including the cycloethylene ketals, are useful for the control of insects. The utility of these compounds as insect control agents is beleived to be attributable to their juvenile hormone activity. They are preferably applied to the immature insect, namely — during the embryo, larvae or pupae stage in view of their ability to inhibit metamorphosis and otherwise cause abnormal development. These compounds are effective control agents for Hemipteran insects, such as Lygaeidae, Miridae and Pyrrhocoridae; Lepidopteran insects, such as Pyralidae, Noctiidae and Gelechiidae; and Coleopteran; such as Tenebrionidae; and Dipteran. The compounds can be applied at low dosage levels of the order of 0.001 $\mu$g. to 15.0 $\mu$g. per insect. Suitable carrier substances include liquid or solid carriers, such as water, mineral or vegetable oils, talc, vermiculite, natural and synthetic resins and silica. Treatment of insects in accordance with the present invention is accomplished by spraying, dusting or exposing the insects to the vapor of the compounds of formula A. Generally, a concentration of less than 25 percent of the active compound is employed. The formulations can include insect attractants, emulsifying agents or wetting agents to assit in the application and effectiveness of the active ingredient. In the application of the compounds, there is generally employed a mixture of the C-2,3 trans and cis isomers, the C-2,3 trans isomer being the preferred embodiment for the control of insects.

In the description following and hereinafter, each of $n$, $m$, $R^1$, $R^2$, $R^3$, $R^4$, $R^5$ and $R^6$ is defined as hereinabove.

The novel unsaturated ketones of the present invention are prepared according to the following outlined synthesis.

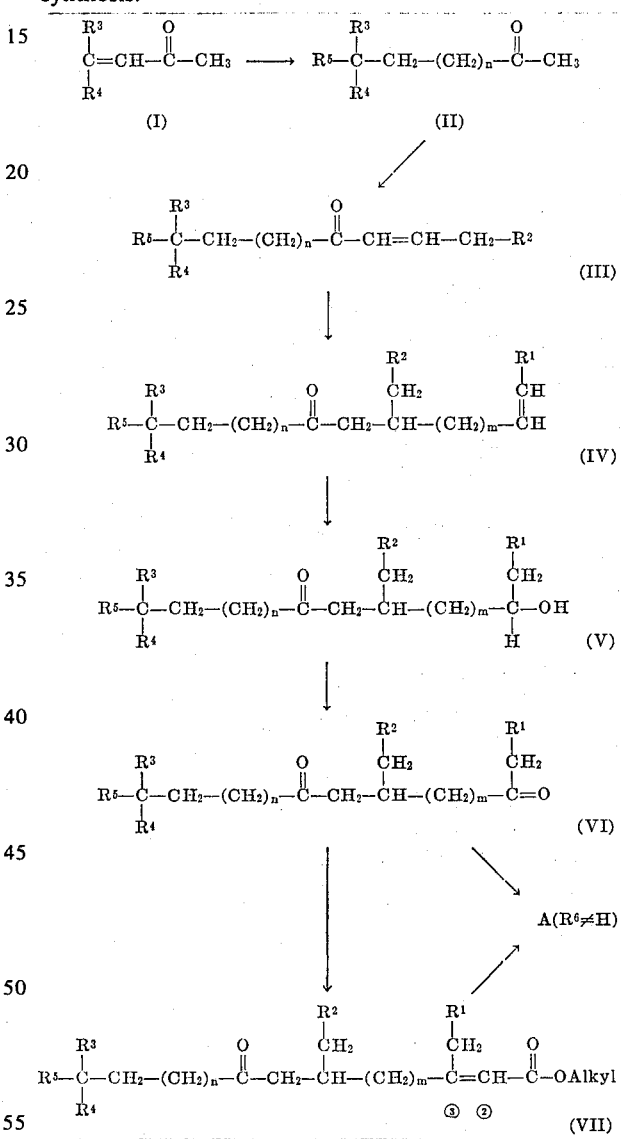

In the practice of the above-outlined synthesis, a methyl ketone (I) is alkylated using an organo-copper complex prepared from cuprous salt, e.g. cuprous halide and lower alkylmagnesium halide or lower alkyl lithium to form the ketone (II) wherein n is zero. The organo complex can be formed as described by Siddall et al., *J. Am. Chem. Soc.* 91, 1,853 (1969) and Anderson et al., ibid. 92, 735 (1970). The ketones of formula II wherein $n$ is a positive integer of one to four can be prepared according to procedures described in copending application Ser. No. 879,620, filed Nov. 24, 1969, now abandoned the disclosure of which is incorporated by reference. The methyl ketone (II) is reacted with an aldehyde ($R^2$-CH$_2$-CHO) using Aldol conditions to yield the unsaturated ketone (III). A ketone of formula III is then alkylated using an organo-copper complex (wherein the organo group is $R^1$-CH=CH-$(CH_2)_m$-) formed from cuprous salt and organo-lithium or organo-magnesium halide. A compound of formula IV is then reacted with a mercuric salt, such as mercuric acetate, mercuric chloride, mercuric trifluoroacetate or mercuric nitrate, in the presence of water to form the mercuric salt of V which is reduced using sodium borohydride, sodium amalgam, hydrazines, or the like, to yield the hydroxyl (V). When R is lower alkyl, the reaction results in introduction of the hydroxy group at two positions so as to form the compounds of formula V' as well as those of formula V:

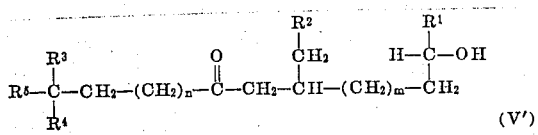

The compounds (V and V') can be separated by chromatography or fractional distillation, if desired. A hydroxy compound of formula V is then oxidized using Jones reagent, manganese dioxide, or the like, to yield the di-ketone (VI). The di-ketone (VI) is converted into the $\alpha,\beta$-unsaturated ester (VII) by reaction with phosphonate anion, e.g. carbanion of dialkyl carbalkoxymethylphosphonate or by Wittig reaction. The esters (VII), e.g. the methyl esters, are converted into the corresponding acid by hydrolysis with base. The acid is reacted with organolithium ($R^6$ Li, wherein $R^6$ is alkyl, cycloalkyl, phenyl or aralkyl) in an organic solvent, such as ether, tetrahydrofuran, or the like, at a temperature of from about $-10°$ C to room temperature, although higher or lower temperatures can be used to yield the $\alpha,\beta$-unsaturated ketone of formula A. Alternatively, a di-ketone of formula VI is converted directly to the $\alpha,\beta$-unsaturated ketone by reaction with the phosphonate anion of formula VIII:

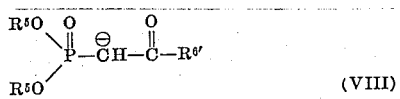

The cycloethylene ketals of the present invention are prepared by treatment of the ketone (R is an oxygen atom) with ethylene glycol in organic solvent, such as toluene, in the presence of acid catalyst, such as P-toluenesulfonic acid. The ketal group is introduced on the ketone (IV) or (V). To retain the ketal group on a compound of formula VI, the oxidation of the hydroxyl (V or VI') should be done using activated manganese dioxide or chromic acid-pyridine complex to avoid the acid conditions of oxidizing agents, such as Jones reagent, which will completely or partially remove the ketal group.

The aldehydes of the present invention (A, $R^6$ is hydrogen) are prepared by reduction of the ester (VII) or acid thereof to the corresponding C-1 alcohol and then oxidation of the alcohol using chromic acid, manganese dioxide, or the like. Suitable procedure is described by Burrell et al., J. Chem. Soc. (C), 2,144 (1966), Weedon et al., J. Chem. Soc., 2,687 (1951) or Helv. Chim. Acta 32, 1,356 (1949). The reduction can be carried out using lithium aluminum hydride, or the like.

The compounds of formula A, in addition to their utility as insect control agents, are useful chemical intermediates, plasticizers for hydrocarbon polymers, lubricants for plastics and metals and odorants for perfumery formulations. The compounds of formulas III, IV, V, V' and VI are useful in chemical syntheses in general, such as preparation of perfumery agents, and are useful odorants for perfumery.

The following examples are provided to illustrate the preparation of the compounds of the present invention. Temperature is given in degrees Centigrade.

EXAMPLE 1

A. To 19 g. of cuprous iodide in 40 ml. of ether, $-20°$ under nitrogen, is added 70 ml. of ethylmagnesium bromide (3M) and 20 ml. of ether. After about 20 minutes, 10 g. of mesityl oxide in 10 ml. of ether is added slowly. The reaction is allowed to proceed until starting material disappears as indicated by vapor phase chromatography. The mixture is poured into iced ammonium chloride solution and extracted with ether. The ether extracts are washed until neutral and evaporated to yield 4,4-dimethylhexan-2-one which is purified by distillation.

The foregoing procedure is repeated using each of methylmagnesium bromide, n-propylmagnesium bromide, i-propylmagnesium bromide and n-butylmagnesium bromide in place of ethylmagnesium bromide to yield 4,4-dimethylpenta-2-one, 4,4-dimethylheptan-2-one, 4,4,5-trimethylhexan-2-one and 4,4-dimethyloctan-2-one, respectively.

B. 40 Milliliters of n-butyl lithium (1.6M in hexane) is added slowly to a stirred solution of 13 ml. of bis(trimethylsilyl) amide in 20 ml. of ether and refluxed for 30 minutes. Tetrahydrofuran (10 ml.) is then added to form a solution of lithium bis(trimethylsilyl)amide.

To 5 g. of 4,4-dimethylhexan-2-one in 4 ml. of tetrahydrofuran, $-78°$ under nitrogen, is added slowly 50 ml. of the above solution. After about 10 minutes, 5 g. of propionaldehyde is added slowly. After about 30 minutes at $-78°$, the reaction is allowed to rise to $0°$. The mixture is extracted with ether and the ether extracts washed with water and brine. Fractional distillation with vigreux column yields 7,7-dimethylnon-3-en-5-one.

The foregoing process is repeated using each of the other quaternary alkyl ketones of Part A as the starting material to yield 7,7-dimethyloct-3-en-5-one, 7,7-dimethyldec-3-en-5-one, 7,7,8-trimethylnon-3-en-5-one and 7,7-dimethylundec-3-en-5-one, respectively.

C. To 2.5 g. of magnesium in 20 ml. of ether, under nitrogen, is added a crystal of iodine and 5 drops of 1-bromopent-4-ene. When the reaction starts, there is then added additional 1-bromopent-4-ene for a total of 15 grams. After about 0.5 hour, temperature is lowered to $-30°$ and cuprous iodide (19 g.) is added. Reaction mixture is left until negative Gilman test obtained and 11 g. of 7,7-dimethylnon-3-en-5-one is added. About 5 minutes after addition is complete, the mixture is poured into ice-cold ammonium chloride and after 1 hour, extracted with ether. The ether extracts are washed, dried and evaporated to yield 6-ethyl-10,10-dimethyldodec-1-en-8-one which is purified by distillation.

The foregoing process is repeated using each of the unsaturated ketones of Part B as the starting material to yield 6-ethyl-10,10-dimethylundec-1-en-8-one, 6-ethyl-10,10-dimethyltridec-1-en-8-one, 6-ethyl-10,10,11-trimethyldodec-1-en-8-one and 6-ethyl-10,10-dimethyltetradec-1-en-8-one, respectively.

D. To 3.2 g. of mercuric acetate in 10 ml. of water is added 10 ml. of tetrahydrofuran followed by 2.2 g. of 6-ethyl-10,10-dimethyldodec-1-en-8-one in a few ml. of tetrahydrofuran. The mixture is stirred about 45 minutes and then 10 ml. of 10 percent sodium hydroxide is added followed by 10 ml. of a solution of 400 mg. of sodium borohydride in 10 ml. of 10 percent sodium hydroxide. After addition is complete, mixture is stirred 5 minutes and allowed to stand several hours at 5°. The layers are separated and ether backwash of water layer combined with organic layer. The organic phase is dried over magnesium sulfate and evaporated to yield 6-ethyl-10,10-dimethyl-8-oxododecan-2-ol which can be purified by distillation.

By use of the foregoing procedure, each of the unsaturated ketones of Part C is converted into the corresponding hydroxyl compound, namely - 6-ethyl-8-oxo-10,10-dimethylundecan-2-ol, 6-ethyl-8-oxo-10,10-dimethyltridecan-2-ol, 6-ethyl-8-oxo-10,10-trimethyl-dodecan-2-ol and 6-ethyl-10,10-dimethyl-8-oxo-tetradecan-2-ol.

E. To a mixture of 8.0 g. of 6-ethyl-10,10-dimethyl-8-oxododecan-2-ol in 300 ml. of acetone is added about 7.5 ml. of Jones Reagent (8N) slowly with stirring. After aoout 1.5 hours, the mixture is poured into saturated sodium chloride and extracted with ether. The ether extracts are dried over sodium sulfate and evaporated under reduced pressure to yield 6-ethyl-10,10-dimethyldodeca-2,8-dione.

The procedure of this process is repeated using each of the hydroxy compounds of Part D as the starting material to yield 6-ethyl-10,10-dimethylundeca-2,8-dione, 6-ethyl-10,10-dimethyltrideca-2,8-dione, 6-ethyl-10,10,11-trimethyldodeca-2,8-dione and 6-ethyl-10,10-dimethyltetradeca-2,8-dione, respectively.

F. To 1.3 g. of sodium hydride (57 percent in oil) previously washed with pentane, under nitrogen, is added 50 ml. of dry tetrahydrofuran and then, after cooling to 0°, is added 7.2 g. of triethyl phosphonoacetate dropwise. The mixture is then stirred for 30 minutes and then added dropwise over about 1 hour to 6.7 g. of 6-ethyl-10,10-dimethyl-dodeca-2,8-dione at room temperature with stirring. The mixture is stirred overnight. Additional phosphonoacetate anion solution is prepared as before from 25 ml, of tetrahydrofuran, 1.8 g. of triethyl phosphonoacetate and 0.32 g. of sodium hydride. This is added over 1 hour to the above reaction mixture and then the total mixture stirred for 20.5 hours. The mixture is poured into 300 ml. of saturated sodium chloride at 0°. The layers are separated and the organic phase with ether backwash of brine layer is dried over mangesium sulfate and evaporated to yield cis and trans ethyl 3,11,11-trimethyl-9-oxo-7-ethyltridec-2-enoate which is purified and separated by chromatography followed by distillation.

By use of the foregoing procedure, each of the 2,8-diones is converted into the corresponding 9-oxo ethyl ester, namely — cis/trans ethyl 3,11,11-trimethyl-9-oxo-7-ethyldodec-2-enoate, cis/trans ethyl 3,11,11-trimethyl-7-ethyl-9-oxotetradec-2-enoate, cis/trans ethyl 3,11,11,12-tetramethyl-9-oxo-7-ethyltridec-2-enoate and cis/trans ethyl 3,11,11-trimethyl-9-oxo-7-ethylpentadec-2-enoate, respectively.

By repeating the foregoing process using the anion of diethyl carbomethoxymethylphosphonate, the corresponding cis/trans methyl esters are obtained, such as cis/trans methyl 3,11,11-trimethyl-9-oxo-7-ethyltridec-2-enoate from 6-ethyl-10,10-dimethyl-dodeca-2,8-dione.

EXAMPLE 2

A mixture of 1 g. of methyl 3,11,11-trimethyl-7-ethyl-9-oxotridec-2-enoate, 60 ml. of methanol, 0.7 g. of sodium carbonate and 6 ml. of water is stirred at about 30° for 20 hours. The mixture is diluted with water, neutralized and extracted with ether. The ethereal phase is washed with water, dried over sodium sulfate and evaporated to yield 3,11,11-trimethyl-7-ethyl-9-oxotridec-2-enoic acid.

Using the foregoing procedure, the other esters of Example 1 are hydrolyzed to the free acid (cis/trans), namely — 3,11,11-trimethyl-9-oxo-7-ethyldodec-2-enoic acid, 3,11,11-trimethyl-9-oxo-7-ethyltetradec-2-enoic acid, 3,11,11,12-tetramethyl-9-oxo-7-ethyltridec-2-enoic acid and 3,11,11-trimethyl-9-oxo-7-ethylpentadec-2-enoic acid, respectively.

EXAMPLE 3

A mixture of 5 g. of ethyl 3,11,11-trimethyl-7-ethyl-9-oxotridec-2-enoate, 1.5 equivalents of ethylene glycol and 250 mg. of p-toluenesulfonic acid monohydrate in 200 ml. of toluene is refluxed for 8 hours under Dean-Stark apparatus with continuous removal of water. The mixture is then cooled, neutralized by addition of sodium carbonate, dried over magnesium sulfate and evaporated under reduced pressure to yield ethyl 3,11,11-trimethyl-7-ethyl-9,9-cycloethylenedioxytridec-2-enoate which is purified by chromatography.

EXAMPLE 4

A mixture of 6-ethyl-8,8-cycloethylenedioxy-10,10-dimethyldodecan-2-ol (2 g.), manganese dioxide (10 g.) and 30 ml. of methylene chloride is prepared by the slow addition of manganese dioxide so that the temperature does not exceed about 30°. The mixture is then shaken for about 40 hours in an atmosphere of nitrogen. The mixture is then filtered and the solid washed with ether. The filtrate and washings are combined and evaporated under reduced pressure to yield 6-ethyl-8,8-cycloethylenedioxy-10,10-dimethyl-dodecan-2-one which can be purified by chromatography.

Jones reagent, as used herein, is prepared by mixing 66.7 g. of chromium trioxide and 53 ml. of concentrated sulfuric acid and then diluting with water up to a total volume of 250 ml.

EXAMPLE 5

A. By use of the procedure of Example 1 (A), each of but-3-en-2-one, pent-3-en-2-one and hept-3-en-2-one, as the starting material, is converted into hexan-2-one, 4-methylhexan-2-one and 4-ethylheptan-2-one, respectively.

B. Each of saturated ketones of Part A is used as the starting material in the procedure of Example 1 (B) to yield nonr3-en-5-one, 7-methylnon-3-en-5-one and 7-ethyldec-3-en-5-one, rspectively, which are used as the starting material in the process of Example 1 (C) to yield 6-ethyldodec-1-en-8-one, 6-ethyl-10-methyldodec-1-en-8-one and 6,10-diethyltridec-1-en-8-one, respectively.

C. Each of the 8-keto compounds of Part B is subject to the process of Example 1 (D) to yield 6-ethyl-8-oxododecan-2-ol, 6-ethyl-10-methyl-8-oxododecan-2-ol and 6,10-diethyl-8-oxotridecan-2-o1, each of which is oxidized according to the procedure of Example 1 (E) to yield 6-ethyldodeca-2,8-dione, 6-ethyl-10-methyldodeca-2,8-dione and 6,10-diethyltrideca-2,8-dione, respectively.

D. The 2,8-diones of Part C are reacted with the anion of diethyl carbethoxymethylphosphonate using the procedure of Example 1 (F) to yield the corresponding cis/trans ethyl esters, cis/trans of ethyl 9-oxo-3-methyl-7-ethyltridec-2-enoate, ethyl 3,11-dimethyl-7-ethyl-9-oxotridec-2-enoate and ethyl 3-methyl-7,11-diethyl-9-oxotetradec-2-enoate, respectively.

EXAMPLE 6

Propionaldehyde is reacted with 5,5-dimethylhexan-2-one using the process of Example 1 (B) to yield 8,8-dimethylnon-3-en-5-one which is used as the starting material in the process of Example 1 (C) to yield 6-ethyl-11,11-dimethyldodec-1-en-8-one. The thus-obtained 1-en-8-one compound is treated with mercuric acetate followed by sodium borohydride to yield 6-ethyl-11,11-dimethyldodecan-2-ol which is oxidized to 6-ethyl-11,11-dimethyldodeca-2,8-dione. The dione is converted to cis/trans ethyl 3,12,12-trimethyl-9-oxo-7-ethyltridec-2-enoate using the procedure of Example 1 (F).

EXAMPLE 7

A. Each of the saturated ketones — 4,4-dimethylhexan-2-one, 4,4-dimethylpentan-2-one, 4,4-dimethylheptan-2-one, hexan-2-one, 4-methylhexan-2-one, 4-ethylheptan-2-one and 5,5-dimethylhexan-2-one is reacted with acetaldehyde using the procedure of Example 1 (B) to yield the corresponding unsaturated ketone — i.e., 6,6-dimethyloct-2-en-4-one, 6,6-dimethylhept-2-en-4-one, 6,6-dimethylnon-2-en-4-one, oct-2-en-4-one, 6-methyloct-2-en-4-one, 6-ethylnon-2-en-4-one and 7,7-dimethyloct-2-en-4-one, respectively.

B. The thus-obtained unsaturated ketones of Part A are used as the starting material in the procedure of Example 1 (C) to yield the corresponding 1-en-8-keto compounds — namely, 6,10,10-trimethyldodec-1-en-8-one, 6,10,10-trimethylundec-1-en-8-one, 6,10,10-trimethyltridec-1-en-8-one, 6-methyldodec-1-en-8-one, 6,10-dimethyldodec-1-en-8-one, 6-methyl-10-ethyltridec-1-en-8-one and 6,11,11-trimethyldodec-1-en-8-one, respectively.

C. Each of the 8-oxo compounds of Part B is reacted with mercuric acetate followed by sodium borohydride using the procedure of Example 1 (D) to yield the corresponding C-2 alcohol — namely, 6,10,10-trimethyl-8-oxododecan-2-ol, 6,10,10-trimethyl-8-oxoundecan-2-ol, 6,10,10-trimethyl-8-oxotridecan-2-ol, 6-methyl-8-oxododecan-2-ol, 6,10-dimethyl-8-oxododecan-2-ol, 6-methyl-10-ethyltridecan-2-ol and 6,11,11-trimethyl-8-oxododecan-2-ol, respectively. Oxidation of the thus-obtained C-2 alcohols using Jones reagent yields the corresponding diketones — i.e., 6,10,10-trimethyldodeca-2,8-dione, 6,10,10-trimethylundeca-2,8-dione, 6,10,10-trimethyltrideca-f2,8-dione, 6-methyldodeca-2,8-dione, 6,10-dimethyldodeca-2,8-dione, 6-methyl-10-ethyltrideca-2,8-dione and 6,11,11-trimethyldodeca-2,8-dione, respectively.

D. Each of the diketones is reacted with the anion of diethyl carbethoxymethylphosphonate using the procedure of Example 1 (F) to yield the corresponding cis/trans α,β-unsaturated ethyl ester — namely, ethyl 3,7,11,11-tetramethyl-9-oxotridec-2-enoate, ethyl 3,7,11,11-tetramethyl-9-oxododec-2-enoate, ethyl 3,7,11,11-tetramethyl-9-oxotetradec-2-enoate, ethyl 3,7-dimethyl-9-oxotridec-2-enoate, ethyl 3,7,11-trimethyl-9-oxotridec-2-enoate, ethyl 3,7-dimethyl-11-ethyl-9-oxotetradec-2-enoate and ethyl 3,7,12,12-tetramethyltridec-2-enoate, respectively. Similarly, the methyl esters are obtained by reaction of the diketones with the anion of diethyl carbomethoxymethylphosphonate.

EXAMPLE 8

Each of the unsaturated ketones of Example 7 (A) is reacted with the Grignard of 1-bromobut-3-ene according to the procedure of Example 1 (C) to yield 5,9,9-dimethylundec-1-en-7-one, 5,9,9-trimethyldec-1-en-7-one, 5,9,9-trimethyldodec-1-en-7-one, 5-methylundec-1-en-7-one, 5,9-dimethylundec-1-en-7-one, 5-methyl-9-ethyldodec-1-en-7-one and 5,10,10-trimethylundec-1-en-7-one, respectively. Each of the thus-obtained 1-en-7-one compounds is used as the starting material in the process of Example 1 (D) to yield the corresponding C-2 alcohol which is oxidized to the corresponding 2,7-dione and then reacted with the anion of diethyl carbethoxymethylphosphonate to yield the cis/trans α,β-unsaturated ethyl ester — namely, ethyl 3,6,10,10-tetramethyl-8-oxododec-2-enoate, ethyl 3,6,10,10-tetramethyl-8-oxoundec-2-enoate, ethyl 3,6,10,10-tetramethyl-8-oxotridec-2-enoate, ethyl 3,6-dimethyl-8-oxododec-2-enoate, ethyl 3,6,10-trimethyl-8-oxododec-2-enoate, ethyl 3,6-dimethyl-10-ethyl-8-oxotridec-2-enoate and ethyl 3,6,11,11-tetramethyl-8-oxododec-2-enoate, respectively.

EXAMPLE 9

A. Each of the unsaturated ketones of Example 7 (A) is reacted with the Grignard of 1-bromohex-4-ene using the procedure of Example 1(C) to yield 7,11,11-trimethyltridec-2-en-9-one, 7,11,11-trimethyldodec-2-en-9-one, 7,11,11-trimethyltetradec-2-en-9-one 7-methyltridec-2-en-9-one, 7,11-dimethyltridec-2-en-9-one, 7-methyl-11-ethyltetradec-2-en-9-one and 7,12,12-trimethyltridec-2-en-9-one, respectively.

B. Each of the ketones obtained in Part A is reacted with mercuric acetate followed by sodium borohydride to yield a mixture of 7,11,11-trimethyl-9-oxotridecan-3-ol and 7,11,11-trimethyl-9-oxotridecan-2-ol; 7,11,11-trimethyl-9-oxododecan-3-ol and 7,11,11-trimethyl-9-oxododecan-2-ol; 7,11,11-trimethyl-9-oxotetradecan-3-ol and 7,11,11-trimethyl-9-oxotetradecan-2-ol; 7,11-dimethyl-9-oxotridecan-3-ol and 7,11-dimethyl-9-oxotridecan-2-ol; 7-methyl-11-ethyl-9-oxotetradecan-3-ol and 7-methyl-11-ethyl-9-oxotetradecan-2-ol; and 7,12,12-trimethyl-9-oxotridecan-3-ol and 7,12,12-trimethyl-9-oxotridecan-2-ol, respectively, each mixture is separated by chromatography to yield the individual C-3 alcohol and C-2 alcohol which are oxidized using Jones reagent to yield the corresponding diketone — namely, 7,11,11-trimethyltrideca-3,9-dione, 7,11,11-trimethyltrideca-2,9-dione, 7,11,11-trimethyldodeca-3,9-dione, 7,11,11-trimethyldodeca-2,9-dione, 7,11,11-trimethyltetradeca-3,9-dione, 7,11,11-trimethyltetradeca-2,9-dione, 7,11-dimethyltrideca-3,9-dione, 7,11-dimethyltrideca-2,9-dione, 7-methyl-11-ethyltetradeca-3,9-dione, 7-methyl-11-ethyltetradeca-2,9-dione, 7,12,12-trimethyltrideca-3,9-dione and 7,12,12-trimethyltrideca-2,9-dione, respectively.

C. Each of the diketones of Part C is reacted with the anion of diethyl carbethoxymethylphosphonate to yield the corresponding cis/trans $\alpha,\beta$-unsaturated ethyl ester, i.e., ethyl 3-ethyl-7,11,11-trimethyl-9-oxotridec-2-enoate, ethyl 3,8,12,12-tetramethyl-10-oxotetradec-2-enoate, ethyl 3-ethyl-7,11,11-trimethyl-9-oxododec-2-enoate, ethyl 3,8,12,12-tetramethyl-10-oxotridec-2-enoate, ethyl 3-ethyl-7,11,11-trimethyl-9-oxotetradec-2-enoate, ethyl 3,8,12,12-tetramethyl-10-oxopentadec-2-enoate, ethyl 3-ethyl-7,11-dimethyl-9-oxotridec-2-enoate, ethyl 3,8,12-trimethyl-10-oxotetradec-2-enoate, ethyl 3-ethyl-7-methyl-11-ethyl-9-oxotetradec-2-enoate, ethyl 3,8-dimethyl-12-ethyl-10-oxopentadec-2-enoate, ethyl 3-ethyl-7,12,12-trimethyl-9-oxotridec-2-enoate and ethyl-3,8,13,13-tetramethyl-10-oxotetradec-2-enoate, respectively.

EXAMPLE 10

To 130 mg. of a 57 percent dispersion of sodium hydride in oil is added pentane. The pentane is removed and sodium hydride washed several times with pentane. To the washed sodium hydride is added 590 mg. of diethyl acetylmethylphosphonate in 5 ml. of dry tetrahydrofuran at −10° under argon. After several minutes, the solution is transferred to a solution of 550 mg. of 6-ethyl-10,10-dimethyldodeca-2,8-dione in about 4 ml. of dry tetrahydrofuran under argon over a period of about 20 minutes at room temperature. After about 2 hours, water is added followed by addition of ether and the layers separated. The organic layer is washed with saturated sodium chloride, dried over sodium sulfate and evaporated under reduced pressure to yield 4,12,12-trimethyl-8-ethyl-tetradec-3-ene-2,10-dione.

Using the above procedure, other methyl ketones of formula A are prepared by the reaction of a ketone of Formula VI with the anion of diethyl acetylmethylphosphonate. For example, each of 6-ethyl-10,10-dimethylundeca-2,8-dione, 6-ethyl-10,10-dimethyltrideca-2,8-dione, 6-ethyl-10,10,11-trimethyldodeca-2,8-dione, 6-ethyl-10,10-dimethyltetradeca-2,8-dione, 6-ethyl-8,8-cycloethylenedioxy-10,10-dimethyldodecan-2-one, 6-ethyldodeca-2,8-dione, 6-ethyl-10-methyldodeca-2,8-dione, 6,10-diethyltrideca-2,8-dione, 6-ethyl-11,11-dimethyldodeca-2,8-dione, 6,10,10-trimethyldodeca-2,8-dione, 6,10,10-trimethylundeca-2,8-dione, 6,10,10-trimethyltrideca-2,8-dione, 6-methyldodeca-2,8-dione, 6,10-dimethyldodeca-2,8-dione, 6-methyl-10-ethyltrideca-2,8-dione, 6,11,11-trimethyldodeca--dione, 7,11,11-trimethyltrideca-3,9-dione, 7,11-dimethyltrideca-3,9-dione, 7,11-trimethyltrideca-2,9-dione and 7,12,12-trimethyltrideca-2,9-dione yields 4,12,12-trimethyl-8-ethyltridec-3-ene-2,10-dione, 4,12,12-trimethyl-8-ethylpentadec-3-ene-2,10-dione, 4,12,12,13-tetramethyl-8-ethyltetradec-3-ene-2,10-dione, 4,12,12-trimethyl-8-ethylhexadec-3-ene-2,10-dione, 4,12,12-trimethyl-8-ethyl-10,10-cycloethylenedioxytetradec-3-en-2-one, 8-ethyltetradec-3-ene-2,10-dione, 4,12-dimethyl-8-ethyltetradec-3-ene-2,10-dione, 4-methyl-8,12-diethylpentadec-3-ene-2,10-dione, 4,13,13-trimethyl-8-ethyltetradec-3-ene-2,10-dione, 4,8,12,12-tetramethyltetradec-3-ene-2,10-dione, 4,8,12,12-tetramethyltridec-3-ene-2,10-dione, 4,8,12,12-tetramethylpentadec-3-ene-2,10-dione, 4,8-dimethyltetradec-3-ene-2,10-dione, 4,8,12-trimethyltetradec-3-ene-2,10-dione, 4,8-dimethyl-12-ethylpentadec-2,10-dione, 4,8,13,13-tetramethyltetradec-3-en-2,10-dione, 4-ethyl-8,12,12-trimethyltetradec-3-ene-2,10-dione, 4-ethyl-8,12-dimethyltetradec-3-ene-2,10-dione and 4,9,14,14-tetramethylpentadec-3-ene-2,11-dione, respectively.

EXAMPLE 11

To a stirred solution of 2.5 g. of 3,11,11-trimethyl-7-ethyl-9-oxotridec-2-enoic acid in 30 ml. of dry ether is added slowly, at 0°, 25 ml. of a one molar solution of ethyl lithium in ether. After about 3 hours at 20°, the mixture is poured into iced 1N hydrochloric acid (about 100 ml.) with vigorous stirring. The ether layer is separated, combined with ethereal washings of the aqueous phase, washed with water, saturated potassium bicarbonate and then saturated brine, dried over magnesium sulfate and concentrated under reduced pressure to yield 5,13,13-trimethyl-9-ethylpentadec-4-ene-3,11-dione which can be purified by vacuum distillation or chromatography.

By using methyl lithium, n-propyl lithium, t-butyl lithium, n-butyl lithium, phenyl lithium, benzyl lithium and cyclopentyl lithium in the foregoing process, there is obtained methyl 2,10,10-trimethyl-8-oxo-6-ethyldodec-1-enyl ketone, n-propyl 2,10,10-trimethyl-8-oxo-6-ethyldodec-1-enyl ketone, t-butyl 2,10,10-trimethyl-8-oxo-6-ethyldodec-1-enyl ketone, n-butyl 2,10,10-trimethyl-8-oxo-6-ethyldodec-1-enyl ketone, phenyl 2,10,10-trimethyl-8-oxo-6-ethyldodec-1-enyl ketone, benzyl 2,10,10-trimethyl-8-oxo-6-ethyldodec-1-enyl ketone and cyclopentyl 2,10,10-trimethyl-8-oxo-6-ethyldodec-1-enyl ketone, respectively.

Similarly, other acids prepared by the hydrolysis of esters of formula VII are converted into the ketones of formula A.

EXAMPLE 12

A. A solution of 2 g. of methyl 3,11,11-trimethyl-7-ethyl-9,9-cycloethylenedioxytridec-2-enoate in 20 ml. of dry ether is added with stirring to 0.4 g. of lithium aluminum hydride covered with ether at 0°. After about 1.5 hours, 2.5 ml. of acetic acid is added. The mixture is washed with ice water and the ether phase dried and evaporated under reduced pressure to yield 3,11,11-trimethyl-7-ethyl-9,9-cycloethylenedioxytridec-2-en-1-ol.

B. A mixture of 2g. of the C-1 alcohol of Part A, 10 g. of manganese dioxide and 30 ml. of methylene chloride is prepared by the slow addition of manganese dioxide so that the temperature does not exceed about 30°. The mixture is then shaken for 48 hours, under nitrogen, at room temperature. The mixture is then filtered and the solid washed with ether. The filtrate and washings are combined and evaporated under reduced pressure to yield the aldehyde, 3,11,11-trimethyl-7-ethyl-9,9-cycloethylenedioxytridec-2-en-1-al which can be purified by distillation or chromatography.

EXAMPLE 13

To 1 gram of 3,11,11-trimethyl-7-ethyl-9,9-cycloethylene-dioxytridec-2-en-1-ol in 20 ml. of tetrahydrofuran is added 2 to 5 ml. of water and 0.1 g. of p-toluenesulfonic acid. The mixture is left at room temperature overnight. The mixture is then worked up by addition of saturated sodium chloride and extraction with ether to yield 3,11,11-trimethyl-7-ethyl-9-oxotridec-2-en-1-ol which is oxidized according to the procedure of Example 12 (B) to the C-1 aldehyde.

EXAMPLE 14

Each of 6,10,10-trimethyldodeca-2,8-dione and 6,10-dimethyldodeca-2,8-dione is reacted with the anion of diethyl β-(cyclohexylimino)ethyl phosphonate generated by sodium hydride followed by hydrolysis of the resulting α,β-unsaturated aldimine following the prcedure of Nagata et al., *Tetrahedron Letters*, No. 41, 4,359–4,362 (1968) and J. Chem. Soc. (C), 460 (1969) to yield 3,7,11,11-tetramethyl-9-oxotridec-2-en-1-al and 3,7,11-trimethyl-9-oxotridec-2-en-1-al, respectively. Similarly, other compounds of formula VI can be converted into the corresponding αβ-unsaturated aldehyde.

What is claimed is:

1. A compound selected from those of the following formula VI:

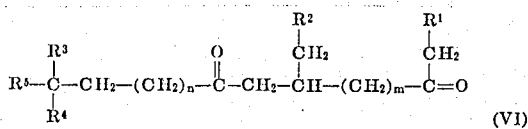

(VI)

wherein, $m$ is a positive integer of one to five;

$n$ is zero or a positive integer of one to four;

each of $R^1$ and $R^2$ is hydrogen or lower alkyl having a chain length of one to five carbon atoms;

$R^3$ is hydrogen or lower alkyl having a chain length of one to six carbon atoms;

$R^4$ is hydrogen or lower alkyl having a chain length of one to six carbon atoms; and $R^5$ is lower alkyl having a chain length of one to six carbon atoms.

2. A compound according to claim 1 wherein $n$ is zero or one and $m$ is two to four.

3. A compound according to claim 2 wherein each of $R^1$ and $R^2$ is hydrogen or methyl; each of $R^3$ and $R^5$ is lower alkyl; and $R^4$ is hydrogen or lower alkyl.

4. A compound according to claim 1 wherein $m$ is two to four; $n$ is zero to three; each of $R^1$ and $R^2$ is hydrogen or methyl; each of $R^3$ and $R^5$ is methyl or ethyl; and $R^4$ is hydrogen, methyl or ethyl.

5. A compound according to claim 4 wherein $n$ is zero or one; $m$ is three; and $R^1$ is hydrogen.

6. A compound according to claim 5 wherein $R^3$ is methyl or ethyl; $R^4$ is hydrogen or methyl; and $R^5$ is methyl.

7. A compound according to claim 4 wherein $n$ is zero; $m$ is three; $R^1$ is hydrogen; each of $R^2$, $R^4$ and $R^5$ is methyl; and $R^3$ is ethyl.

* * * * *